United States Patent
Bolar et al.

(10) Patent No.: US 12,168,476 B2
(45) Date of Patent: Dec. 17, 2024

(54) PILLAR HAVING VARIABLE STRENGTH

(71) Applicants: MAGNA INTERNATIONAL INC., Aurora (CA); Nikhil Bolar, Royal Oak, MI (US); Arun Prasath Pandiyan, Rochester Hills, MI (US); Sri Sai Karan Mummoju, Madison Heights, MI (US); Girish Pallathadka, Rochester Hills, MI (US); Gabriel Cordoba, Rochester Hills, MI (US); Edward Schleichert, Munich (DE)

(72) Inventors: Nikhil Bolar, Royal Oak, MI (US); Arun Prasath Pandiyan, Rochester Hills, MI (US); Sri Sai Karan Mummoju, Madison Heights, MI (US); Girish Pallathadka, Rochester Hills, MI (US); Gabriel Cordoba, Rochester Hills, MI (US); Edward Schleichert, Munich (DE)

(73) Assignee: MAGNA INTERNATIONAL INC., Aurora (CA)

( * ) Notice: Subject to any disclaimer, the term of this patent is extended or adjusted under 35 U.S.C. 154(b) by 170 days.

(21) Appl. No.: 17/772,164

(22) PCT Filed: Oct. 29, 2020

(86) PCT No.: PCT/US2020/057969
§ 371 (c)(1),
(2) Date: Apr. 27, 2022

(87) PCT Pub. No.: WO2021/087117
PCT Pub. Date: May 6, 2021

(65) Prior Publication Data
US 2022/0371662 A1 Nov. 24, 2022

Related U.S. Application Data

(60) Provisional application No. 62/927,845, filed on Oct. 30, 2019.

(51) Int. Cl.
*B62D 25/04* (2006.01)
*B21D 53/88* (2006.01)
(Continued)

(52) U.S. Cl.
CPC ............. *B62D 25/04* (2013.01); *B21D 53/88* (2013.01); *C21D 1/18* (2013.01); *C21D 9/0068* (2013.01);
(Continued)

(58) Field of Classification Search
CPC .............................. B62D 25/04; B62D 21/157
(Continued)

(56) References Cited

U.S. PATENT DOCUMENTS

2004/0113461 A1  6/2004  Shimizu et al.
2010/0308623 A1  12/2010  Bodin et al.
(Continued)

OTHER PUBLICATIONS

Office Action mailed on Apr. 28, 2023 for Chinese Patent Application No. 202080075818.3, titled Pillar Having Variable Strength (15 pages).

*Primary Examiner* — Dennis H Pedder
(74) *Attorney, Agent, or Firm* — Dickinson Wright PLLC (57) ABSTRACT

A pillar for a vehicle including at least two different localized areas of different tensile strengths. The pillar includes a body defining a width that merges into sidewalls at a transition. The body having a first tensile strength and the transition has a second tensile strength, wherein the first tensile strength is smaller than the second tensile strength. The variety in tensile strength resulting from at least one of varying the material treatment and varying the gauge. The pillar is press-hardened until it reaches a tensile strength of 1500 MPa to 2000 Mpa.

9 Claims, 7 Drawing Sheets

(51) Int. Cl.
*C21D 1/18* (2006.01)
*C21D 9/00* (2006.01)
*B62D 21/15* (2006.01)

(52) U.S. Cl.
CPC ........ *B62D 21/157* (2013.01); *C21D 2221/00* (2013.01)

(58) Field of Classification Search
USPC ....................................... 296/193.06, 29, 30
See application file for complete search history.

(56) References Cited

U.S. PATENT DOCUMENTS

| | | |
|---|---|---|
| 2011/0210581 A1 | 9/2011 | Kunishi et al. |
| 2017/0096171 A1 | 4/2017 | Frost et al. |
| 2018/0251160 A1 | 9/2018 | Hamada et al. |
| 2019/0106155 A1 | 4/2019 | Singh et al. |

PILLAR HAVING VARIABLE STRENGTH

CROSS-REFERENCE TO RELATED APPLICATIONS

This U.S. National Stage Patent Application claims the benefit of PCT International Patent Application Serial No. PCT/US2020/057969 filed Oct. 29, 2020 entitled "PILLAR HAVING VARIABLE STRENGTH" which claims the benefit of and priority to U.S. Provisional Patent Application Ser. No. 62/927,845 filed on Oct. 30, 2019, and titled "Variable Gauge B-Pillar," the entire disclosures of which are hereby incorporated by reference.

BACKGROUND OF THE INVENTION

1. Field of the Invention

The present invention relates a pillar for an automobile and a method of assembling same. More particularly, the present invention relates to a pillar having variable material properties and method of assembling same.

2. Related Art

This section provides background information related to the present disclosure which is not necessarily prior art.

Automobiles are the subject of a continuing effort to reduce weight and increase fuel efficiency. This continuing effort has driven the automotive industry to develop metal with improved strength and ductility allowing the use of thinner gauges while still maintaining safety standards. During production, these metals often start as metal blanks that are later stamped into automotive parts. Depending on an end use, automotive parts require different levels of strength and ductility to meet standards set by the automotive industry. Moreover, individual parts can be subjected to one type of stress in one direction and an increased type of stress in another direction. These varying directional stresses may ultimately expose individual parts to inconsistent stresses in localized portions. For example, various Body-In-White (BIW) frame members are known to experience varying directional stresses. One frame member particularly exposed to varying stresses are the pillars, which must be strong enough to prevent axial compression during a rolling event and also strong enough to prevent transverse buckling during a side-impact event.

Attempts to produce parts with improved workability having localized areas with different levels of ductility and strength have resulted in the development of several processes in which localized areas of a part can be treated. These treatment processes typically involve some way of heating the part to temperatures at which the physical and sometimes chemical property of the underlying metal is changed. Depending on the constituents of the metal alloy used, when a part is heated to a certain temperature, the constituents can form an uninterrupted microstructure before being cooled. While these treated parts can be made at thinner gauges to reduce weight, treated parts have become so hard that they are not suitably ductile and can also be difficult to shape and connect to other neighboring parts.

Accordingly, there is a continuing desire to further develop and refine the construction of automotive parts subjected to varying directional stresses such that they meet strength and ductility requirements with no or minimal increases in weight.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a pillar for a vehicle is provided. The pillar comprises a roof portion for connection proximate the roof of a vehicle and a floor portion for connection proximate a floor of a vehicle. A body extends longitudinally between the roof portion and the floor portion and laterally between a pair of opposite longitudinal edges. The roof portion, the floor portion, and the body define a middle portion. Sidewalls extend transversely from the longitudinal edges at a transition. The middle portion at least partially has a first tensile strength and the transition at least partially has a second tensile strength, wherein the first tensile strength is less than the second tensile strength.

According to another aspect of the present disclosure, a method of constructing a pillar for a vehicle is provided. The method comprises the steps of determining a minimum gauge of the pillar. Forming the pillar out of the minimum gauge, the pillar including a body and sidewalls extending transversely from the body at a transition, and modifying the tensile strength of the transition.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a B-pillar for an automobile and method of assembling same. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the pillar for an automobile and method of assembling same are intended for providing a strong and relatively lightweight design for protecting passengers, absorbing impacts, and distributing weight.

Figure 1:
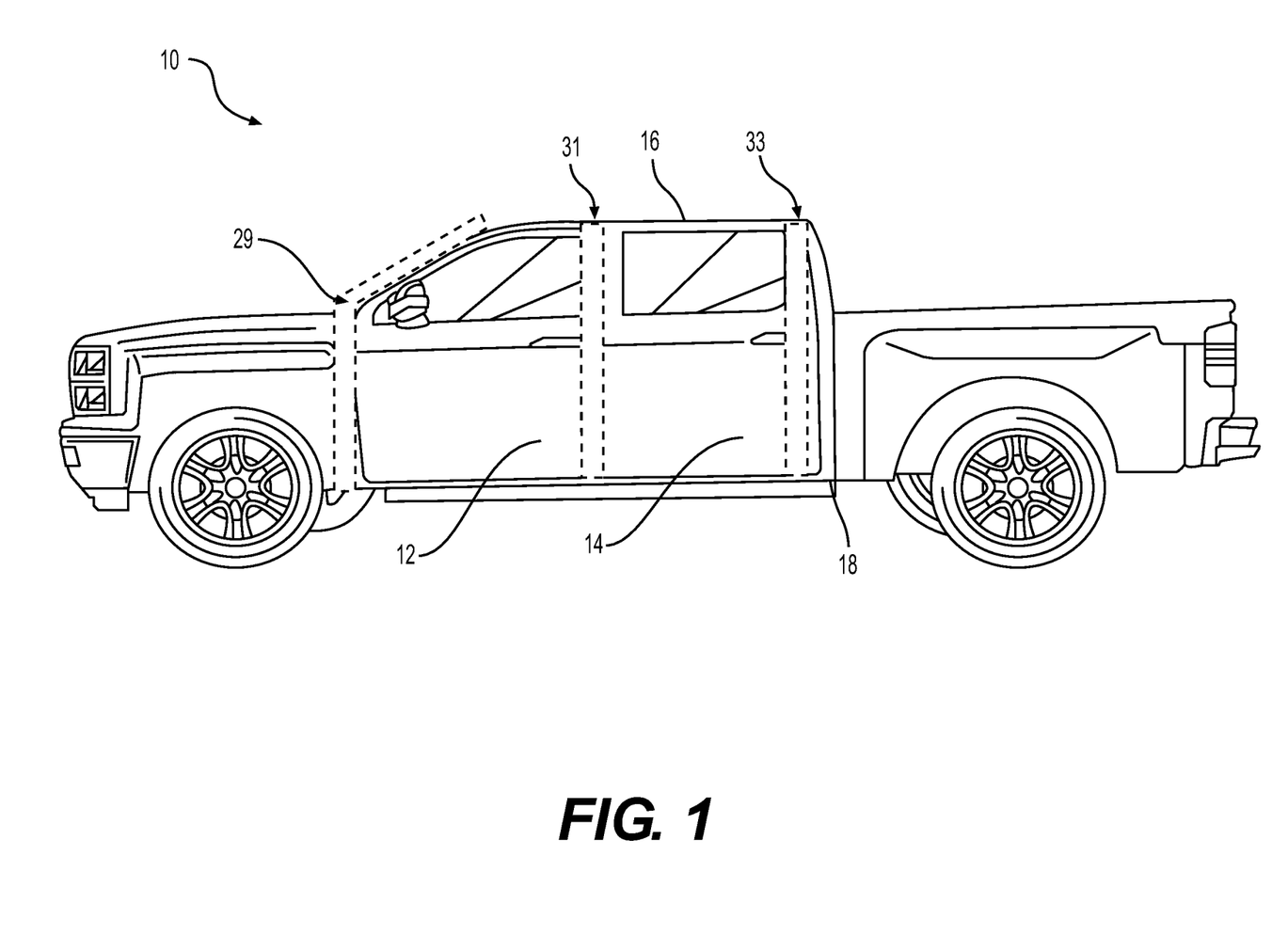
FIG. 1 is a side view of an automobile that includes a series of structural pillars.

Referring initially to FIG. 1, an example automobile 10 is illustrated as a pick-up truck having a pair of front doors 12 and a pair of rear doors 14. Each door 12, 14 is attached to a door frame located between a roof panel 16 and a floor sub-frame 18. Extending substantially vertically between the roof panel 16 and floor sub-frame 18 are a series of structural pillars that provide both axial and transverse support. The series of structural pillars includes a first pillar or an A-pillar 29 that extends between the front window of the automobile and the front door 12, a second pillar or a B-pillar 31 that extends between the front door 12 and the rear door 14, and a third pillar or a C-pillar 33 located between the rear door 14 and the rear window. These pillars 29, 31, 33 may ultimately form vertical sections of the door frame. In addition, it should be appreciated that various other structural pillar (N-pillars) may be included for vehicles having extended cabs. Each structural pillar is generally formed of steel and is connected to a rocker panel and a roof rail such that it extends substantially the entire vertical height of the automobiles cab.

Figure 2:
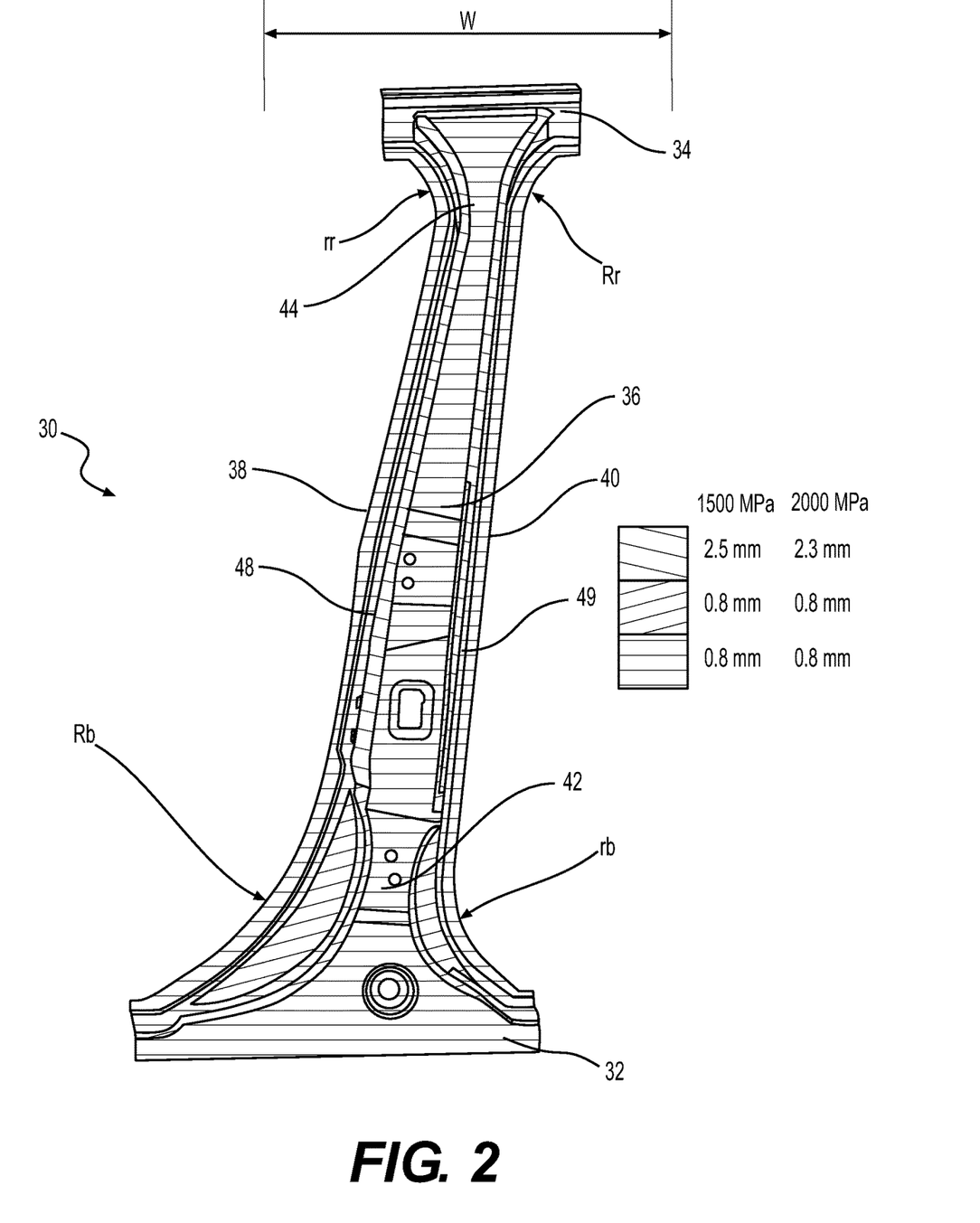
FIG. 2 is a top view of a pillar including localized portions having variable gauges in accordance with a first embodiment.

With reference now to FIG. 2, an isolated pillar 30 is shown in accordance with a first embodiment. The pillar 30, may be a B-pillar and include a floor portion 32 for connection to the rocker panel and a roof portion 34 for connection to the roof rail. An elongated pillar body 36 extends between the floor portion 32 and the roof portion 34. The pillar 30 further includes a front edge 38 that generally faces the front window when installed in the automobile 10 and a rear edge 40 that generally faces the rear window. The front edge 38 and rear edge 40 define a width W of the pillar 30. The front edge 38 and rear edge 40 each diverge from one another in a radially outward relationship at the floor portion 32 to form a floor portion neck 42. In the floor portion neck 42, the front edge 38 radially diverges at a first radius Rb and the rear edge 40 radially diverges at a second radius rb, wherein the first radius is larger than the second radius. Similarly, the front edge 38 and rear edge 40 each diverge from one another in a radially outward relationship at the roof portion 34 to form a roof portion neck 44. In the roof portion neck 44, the front edge 38 radially diverges at a first radius rr and the rear edge 40 radially diverges at a second radius Rr, wherein the first radius rr is smaller than the second radius Rr. In addition, it should be appreciated that each of the first and second radius of the floor portion neck Rb, rb may be larger than each of first and second radius of the roof portion neck Rr, rr.

Figure 3:
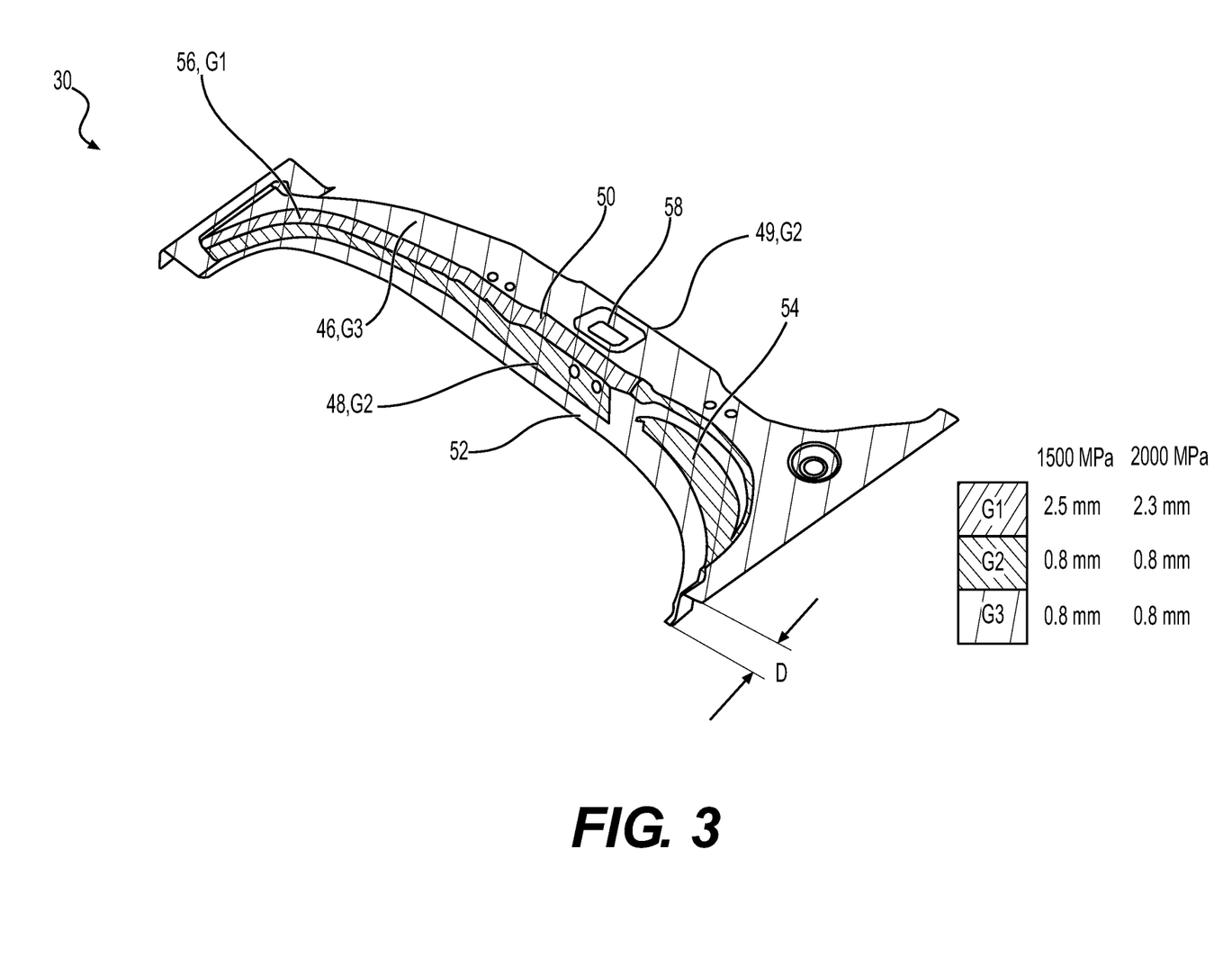
FIG. 3 is a perspective view of the pillar from FIG. 2.

As best illustrated in FIG. 3, the pillar 30 has a middle portion 46 that extends in the for-aft direction of the automobile 10 when it is attached thereto. A pair of sidewalls 48, 49 extend from opposite fore-aft edges of the middle portion 46 towards the interior of the automobile 10. The pair of sidewalls 48, 49 includes a fore-facing sidewall 48 and an aft-facing sidewall 49 (FIG. 2), which both extend in the cross-car direction to define a depth D. The middle portion 46 merges into each of the sidewalls 48, 49 at a transition 50. The transition 50 between the middle portion 46 and each sidewall 48, 49 may be rounded. Each sidewall 48, 49 extends from the transition 50 to a flange 52 located on the opposite side of the depth D. The sidewalls 48, 49 may be generally perpendicular to the middle portion 46. The sidewalls 48 may also each include a rounded portion 54 extending from the floor portion neck 42 to the flange 52. Each rounded portion 54 is rounded in both the width W direction and the depth D direction. The transition 50 near the floor portion neck 42 may narrow with respect to the depth D as a result of the rounded portions 48 of the sidewalls 48 but continues along the entire respective rounded portion 46.

With reference now to both FIG. 1 and FIG. 2, the pillar 30 may include at least two localized portions with distinct gauges (i.e., thickness) and/or tensile strength. In some embodiments, the transition portion 50 includes a reinforced section 56 having a first gauge G1 that extends from the roof portion 34 to the floor portion neck 42. The sidewalls 48, including rounded portions 54, have a second gauge G2. The middle portion 46 and flange 52 have a third gauge G3. In some embodiments, the first gauge G1 is larger (i.e., thicker) than the second gauge G2 and the second gauge G2 is thicker than the third gauge G3. Portions of the pillar forming the various gauges G1, G2, G3 are presented in FIG. 2 and FIG. 3 in grey-scale. A key is located next to each of FIG. 2 and FIG. 3 and provides varying tensile strength availability to the different gauges G1, G2, G3 based on different hardening techniques, such as tempering. In some embodiments, the pillar is press hardened steel with a tensile strength of 1500 MPa and the first gauge G1 is 2.5 mm, the second gauge G2 is 0.8 mm, and the third gauge G3 is 0.8 mm. In some embodiments, the pillar 30 is press hardened steel with a tensile strength of 2000 MPa and the first gauge G1 is 2.3 mm, the second gauge G2 is 0.8 mm, and the third gauge G3 is 0.8 mm. The individual gauges may vary wherein G2 is larger than G3 but smaller than G1 or wherein G2 is smaller than both G3 and G1. Variously shaped apertures 58 are located on the middle portion 46 and sidewalls 48. In some embodiments, the finished pillar is singularly and uniformly tempered. In some embodiments, the gauge may be between 0.7 mm and 3 mm.

Figure 4:
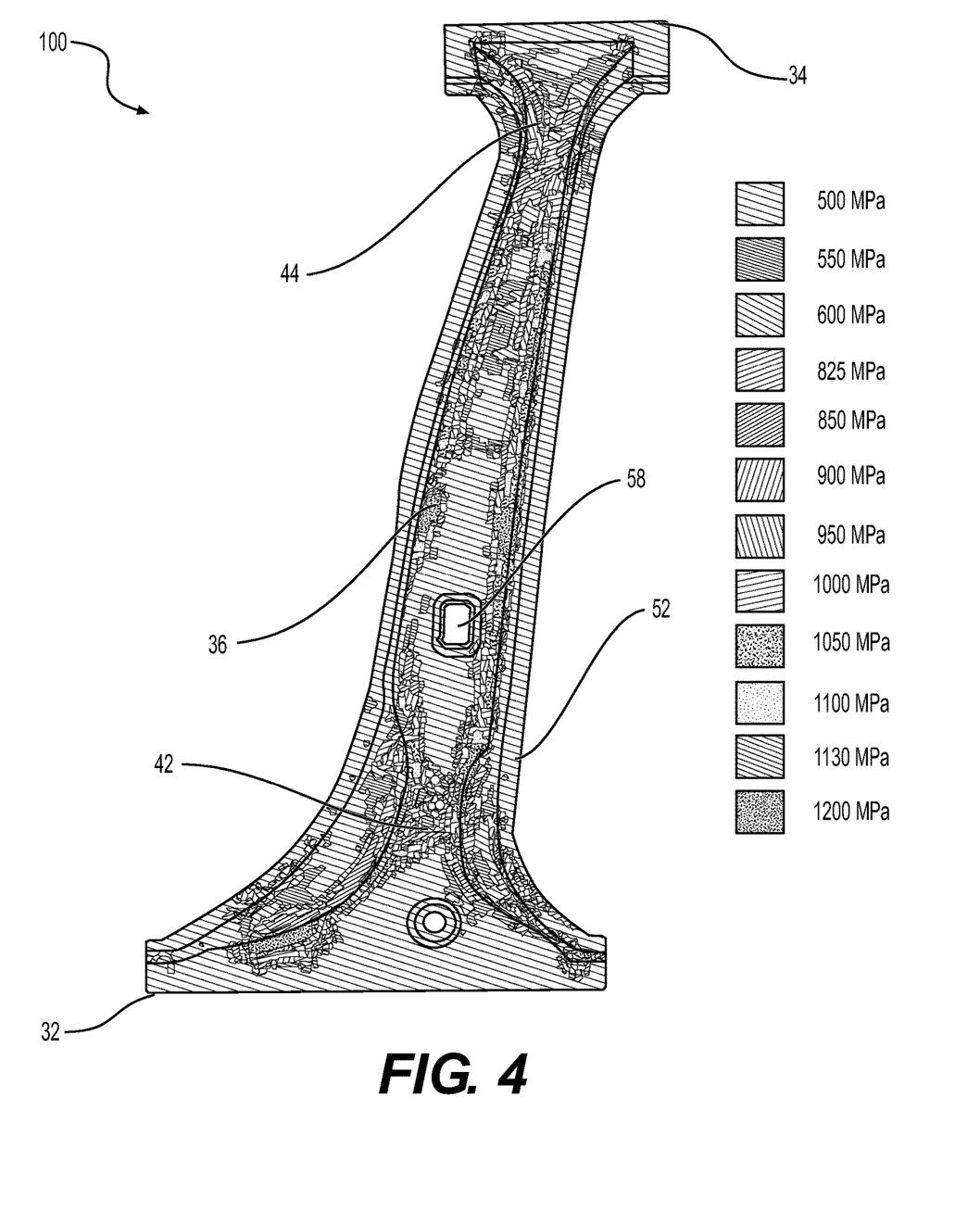
FIG. 4 is a top view of a pillar illustrating localized portions having variable material properties in accordance with a second embodiment.
Figure 5:
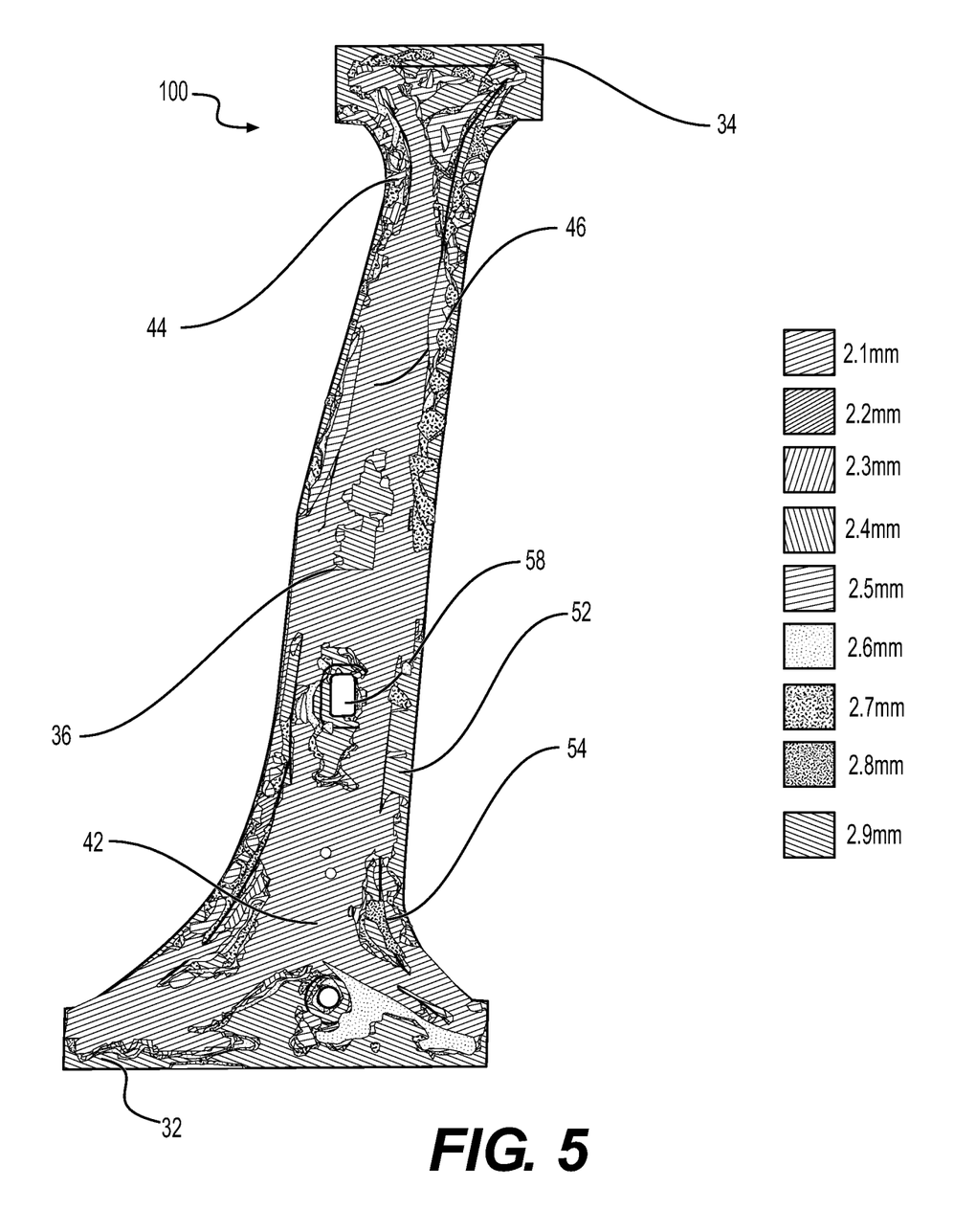
FIG. 5 is a top view of the pillar from FIG. 4 illustrating variable gauges associated with the localized portions having variable material properties.

FIG. 4 and FIG. 5 illustrates a pillar 100 in accordance with a second embodiment. The pillar 100 may be a B-pillar. For purposes of simplicity the shared elements between the pillar 100 and the pillar 30 will be designated the same. It should be appreciated that the overall shape may be primarily the same as that presented in FIG. 2 and FIG. 3 but with changes to the localized area positioning, gauge, and tensile strength.

FIG. 4 illustrates a distribution of tensile strength on the pillar 100, wherein the pillar 100 is press hardened steel with a tensile strength between 500 MPa and 1200 MPa. The distribution of tensile strength may include at least twelve varying tensile strengths each located in a localized area as presented in grey-scale. An area corresponding to the transition 50 may include an increased tensile strength, wherein portion of the transition near the roof portion neck 44 and the rounded portion 54 facing the rearward portion of the vehicle include less tensile strength than other portions of the transition 50. In some embodiments, the flange 52 includes a smaller tensile strength than areas of the transition 50 and middle portion 46. In some embodiments, portions of the middle portion 46 located near the roof portion 34 have greater tensile strength than portions of the middle portion 46 located near the floor portion 32. In some embodiments, portions of the middle portion 46 that surround at least one of the apertures 58 may have a lower tensile strength than other portions of the middle portion 46. In some embodiments, the floor portion neck 42 and the roof portion neck 44 have greater tensile strength than other portions along the elongated pillar body 36, but may also be less than sections of the transitions 50. Other varying distributions of tensile strength are presented in FIG. 4.

FIG. 5 illustrates a distribution of gauge over the pillar 100. In some embodiments, the pillar 100 may include nine distinct gauges varying between 2.1 mm and 2.9 mm generally resulting in the tensile strength distribution provided in FIG. 4. The varying gauges are presented in grey-scale. In some embodiments, the middle portion 46 on the elongated body 36 is primarily a narrower gauge than the middle portion 46 associated with the roof portion 34 and floor portion 32. In some embodiments, the middle portion 46 surrounding the aperture 58 is a greater (thicker) gauge than a surrounding area of the pillar 100. In some embodiments, the flange 52 primarily has a greater gauge than the middle portion 46. In some embodiments, each of the rounded portions 54 primarily have a greater gauge than the middle portion 46. Other varying distributions of gauge are presented in FIG. 5.

Figure 6:
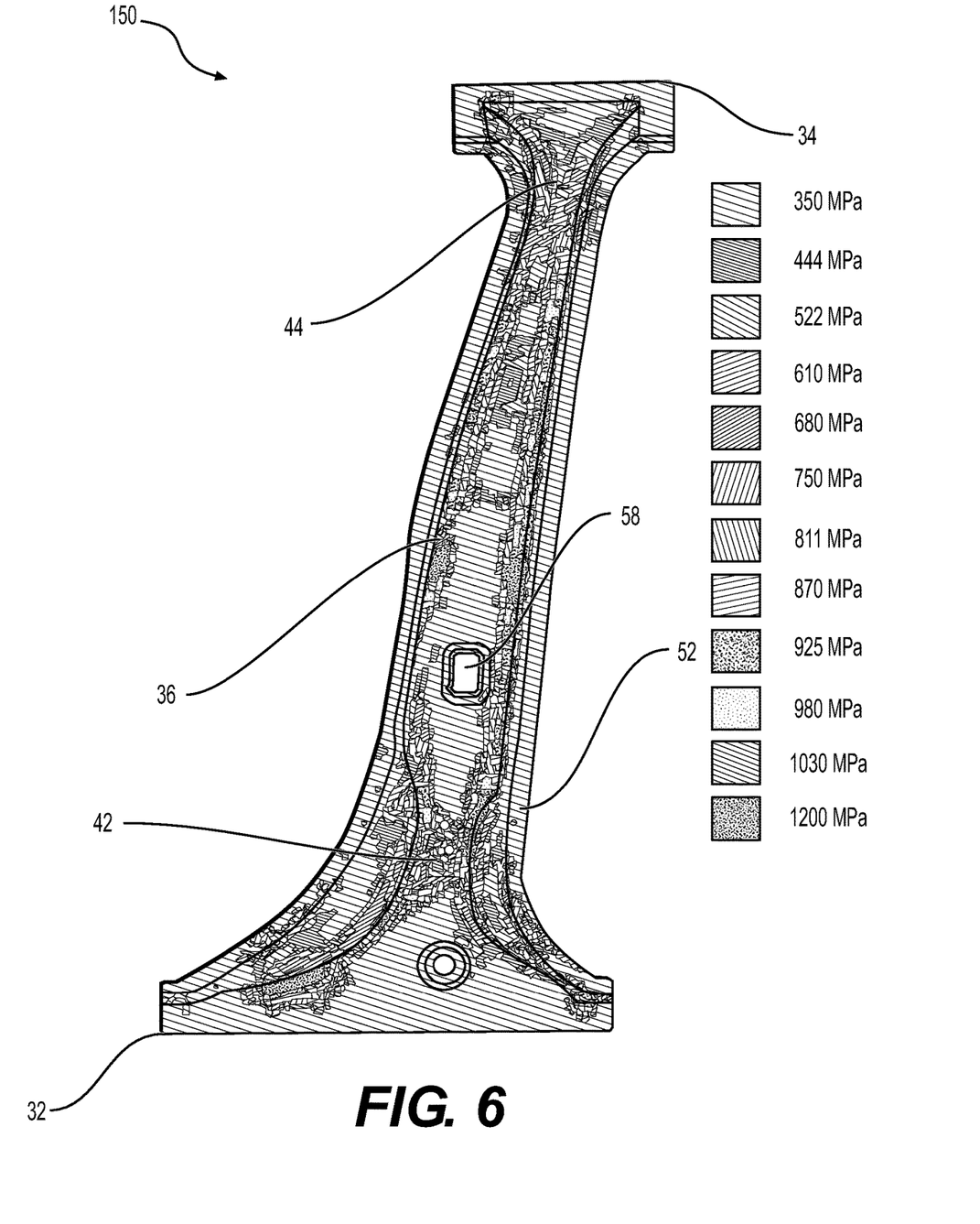
FIG. 6 is a top view of a pillar illustrating localized portions having variable material properties in accordance with a third embodiment.

FIG. 6 illustrates a pillar 150 in accordance with a third embodiment. The pillar 100 may be a B-pillar. For purposes of simplicity the shared elements between the pillar 100 and the previous embodiments will be designated the same. It should be appreciated that the overall shape may be primarily the same as that presented previous embodiments but with changes to the localized area positioning, gauge, and tensile strength. The distribution of tensile strength may include at least twelve varying tensile strengths each located in a localized area as presented in grey-scale. An area corresponding to the transition 50 may include an increased tensile strength over other portions of the pillar 150, wherein portions of the transition near the roof portion neck 44 and the rounded portion 54 facing the rearward portion of the vehicle include less tensile strength than other portions of the transition 50. In some embodiments, the flange 52 includes a smaller tensile strength than areas of the transition 50 and middle portion 46. In some embodiments, portions of the middle portion 46 located near the roof portion 34 have greater tensile strength than portions of the middle portion 46 located near the floor portion 32. In some embodiments, portions of the middle portion 46 that surround at least one of the apertures 58 may have a lower tensile strength than other portions of the middle portion 46. In some embodiments, the floor portion neck 42 and the roof portion neck 44 have greater tensile strength than other portions along the elongated pillar body 36, but may also be less than sections of the transitions 50. Other varying distributions of tensile strength are presented in FIG. 6. In some embodiments, the pillar 150 may be uniformly gauged and the varying tensile strength values may be a results of varying tempering techniques employed to the localized areas as needed. The tempering techniques may include one or more of press-hardening, heat treating to critical temperatures, or quenching. The tempering process may further include changing the microstructure of those areas of increased tensile strength, such that areas corresponding to increased tensile strength correspond to an increased distribution of at least one of martensite or austenite.

While the embodiments described above may be a B-pillar, it should be appreciated that the embodiments may be an A-pillar, C-pillar, or N-pillar.

Figure 7:
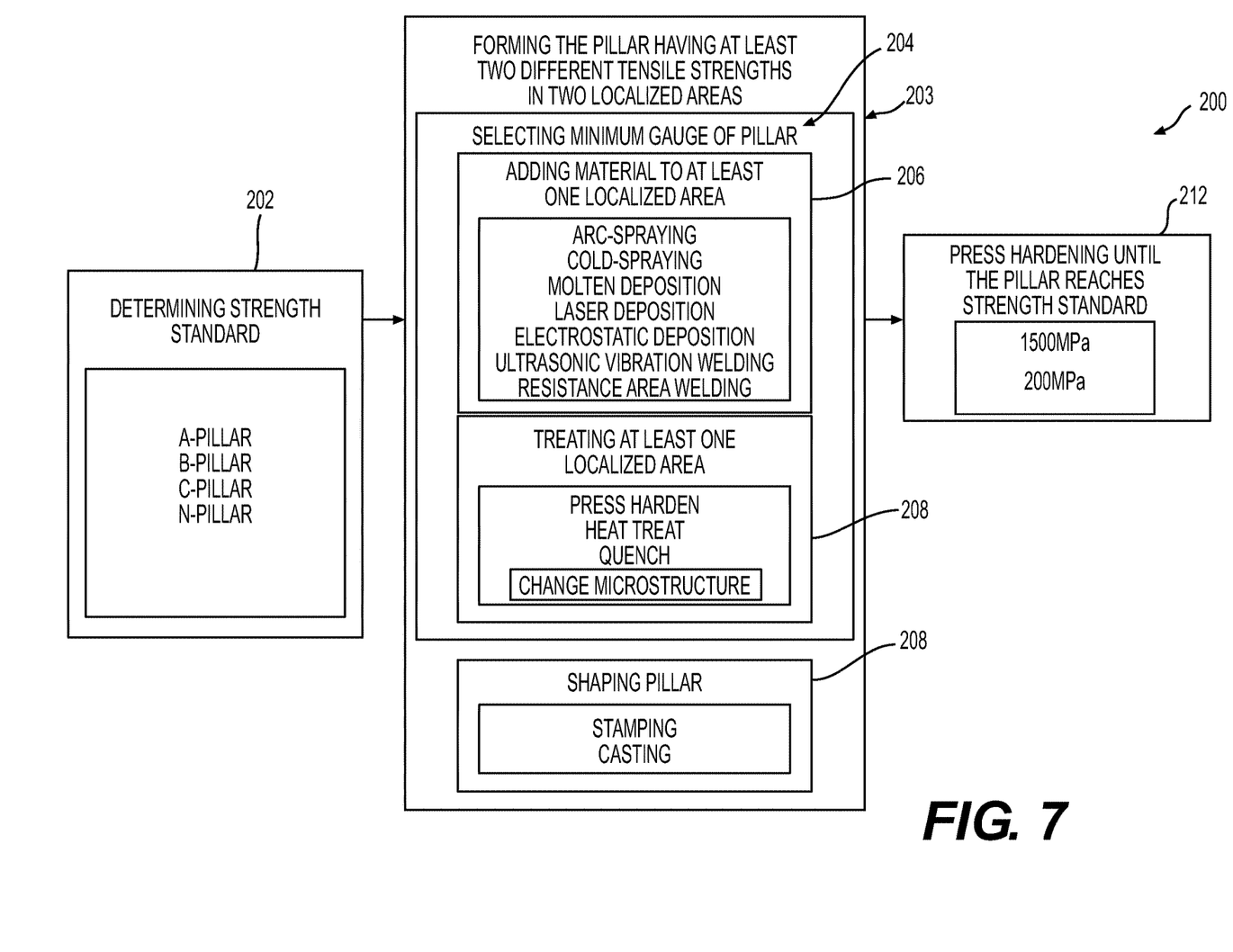
FIG. 7 is a method illustrating the steps of constructing a pillar for a vehicle.

A process 200 of constructing a pillar is presented in FIG. 7 in accordance with the present disclosure. The process begins by determining strength a standard 202 for a pillar based on the type of vehicle or other conditions. The pillar could be an A-pillar, a B-pillar, a C-pillar . . . N-pillar. At 202, the standard may be set by the automotive industry.

The method 200 continues by forming 203 the pillar such that it has at least two different tensile strengths in two different localized areas. The method at 203 may include selecting 204 a minimum gauge of the pillar and at least one of adding material 206 to at least one localized area and treating 208 at least one localized area. In some embodiments, at 206, the pillar is formed out of a steel material having a heavy gauge of over 2 mm and a light gauge of under 1 mm. In some embodiments, at 206, material is added to at least a portion of a transition (the at least one localized area) between a middle portion and a sidewall of the pillar. In some embodiments, the step 206 may include at least one of: an arc-spraying procedure that utilizes an electric arc to melt wires; a cold spraying procedure wherein particles are accelerated at very high speeds by a carrier gas forced through a converging-diverging de Laval type nozzle; placing molten material thereon and allowing it to cool; a laser metal deposition process wherein metal is applied to a surface of a component in sequential layers via semi-controlled molten bath on the surface of the part that one or more metal powders is sprayed onto through a nozzle; resistance area welding wherein a rolling electrode is used to weld a surface area of one metal part to the surface area of another metal part; or ultrasonic welding wherein a clamped force is applied between two metal parts and vibrated at high frequencies. Step 206 may further include the use of an electromagnetically assisted spray process as described in International Application Number PCT/US19/50753, having an international filing date of Sep., 12, 2019, which is incorporated in its entirety herein by reference.

In some embodiments, at step 208, the method 200 may include at least one of press hardening, heat treating, quenching the at least one localized area. At 208, these treatment techniques may include changing the microstructure of the at least one localized area such that the at least one localized area includes an increased amount of at least one of martensite and austenite. At 210, the method 200 includes shaping the pillar by one of stamping or casting. Step 210 may occur before or after step 206 and 208 depending on the method of formation. In some embodiments, if the pillar is casted at 210, the steps 206 and 208 may occur afterwards. In some embodiments, if the pillar is stamped at 210, the steps 206 and 208 may occur before or afterwards. During, after, or before step 203, the pillar may be press hardened 212 until it reaches tensile strength of at least 1500 MPa or at least 2000 MPa.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A pillar for a vehicle comprising:
    a roof portion for connection proximate the roof of a vehicle and a floor portion for connection proximate a floor of a vehicle;
    a body extending longitudinally between the roof portion and the floor portion;
    the roof portion, the floor portion, and the body defining a middle portion;
    a transition disposed between the middle portion and side walls;
    the sidewalls extending transversely from the transition;
    the middle portion at least partially having a first tensile strength, the transition at least partially having a second tensile strength, and the sidewalls at least partially having a third tensile strength; and
    wherein the first tensile strength is less than the second tensile strength and less than the third tensile strength, and the third tensile strength is less than the second tensile strength.

2. The pillar of claim 1, wherein the middle portion has a first gauge and the transition at least partially has a second gauge, and wherein the second gauge is larger than the first gauge.

3. The pillar of claim 2, wherein the second gauge is at least twice as large as the first gauge.

4. The pillar of claim 3, wherein the first gauge is less than 1 mm and the second gauge is greater than 2 mm.

5. The pillar of claim 2, wherein each sidewall extends from the transition to a flange, wherein the flanges at least partially have a flange gauge that is smaller than the second gauge.

6. The pillar of claim 2, wherein each sidewall includes a rounded portion adjacent to the floor portion, wherein each rounded portion is rounded and at least partially includes a rounded portion gauge that is smaller than the second gauge but larger than the first gauge.

7. The pillar of claim 2, wherein each sidewall at least partially have a sidewall gauge that is smaller than the second gauge but larger than the first gauge.

8. The pillar of claim 1, wherein the middle portion at least partially has a first microstructure and the transition at least partially has a second microstructure, and wherein the first microstructure includes a smaller distribution of at least one of martensite and austenite than the second microstructure.

9. The pillar of claim 1, wherein the pillar is a B-pillar.

* * * * *